United States Patent
Seltzer

(10) Patent No.: US 10,225,720 B2
(45) Date of Patent: *Mar. 5, 2019

(54) METHODS AND SYSTEMS FOR TRANSMISSION OF ARBITRARY DATA VIA BLUETOOTH HFP AUDIO CONNECTIONS WITH LOW LATENCY

(71) Applicant: NAGRAVISION S.A., Cheseaux-sur-Lausanne (CH)

(72) Inventor: Steven Seltzer, Hermenches (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,677

(22) Filed: Dec. 22, 2017

(65) Prior Publication Data

US 2018/0124554 A1 May 3, 2018

Related U.S. Application Data

(63) Continuation of application No. 15/489,300, filed on Apr. 17, 2017, now Pat. No. 9,877,146, which is a
(Continued)

(51) Int. Cl.
*H04W 4/80* (2018.01)
*H04L 29/08* (2006.01)
(Continued)

(52) U.S. Cl.
CPC .............. *H04W 4/80* (2018.02); *G10L 19/167* (2013.01); *H03M 13/39* (2013.01); *H04L 9/00* (2013.01);
(Continued)

(58) Field of Classification Search
CPC ................................ H04W 4/80; H04W 76/10
See application file for complete search history.

(56) References Cited

U.S. PATENT DOCUMENTS

2002/0183005 A1  12/2002  Yl et al.
2007/0214402 A1   9/2007  Heiman
(Continued)

OTHER PUBLICATIONS

Gregorgian, R., et al., "A continuously variable slope adaptive delta modulation codec system", IEEE Journal of Solid-State Circuits, vol. 18, No. 6, Dec. 1, 1983, 10 pages.
(Continued)

*Primary Examiner* — Tuan H Nguyen
(74) *Attorney, Agent, or Firm* — Oblon, McClelland, Maier & Neustadt, L.L.P.

(57) ABSTRACT

Methods and apparatus are provided that relate to receiving a bit pattern that is representative of a binary data sequence; generating a multi-bit data byte sequence that is representative of the bit pattern by, for at least one bit in the bit pattern: outputting a larger-valued multi-bit data byte that is larger than a byte-sequencer reference data byte according to a first criteria, outputting a smaller-valued multi-bit data byte that is smaller than the byte-sequencer reference data byte according to a second criteria; and encoding the generated multi-bit data byte sequence by, for each generated multi-bit data byte: outputting a single bit whose value is indicative of whether the generated multi-bit data byte is larger or smaller than a current reference multi-bit data byte and updating the current reference multi-bit data byte based on the generated multi-bit data byte.

16 Claims, 10 Drawing Sheets

Related U.S. Application Data continuation of application No. 14/849,284, filed on Sep. 9, 2015, now Pat. No. 9,628,944.

(51) Int. Cl.

| | | |
|---|---|---|
| *G10L 19/16* | (2013.01) | |
| *H04L 9/00* | (2006.01) | |
| *H04L 25/49* | (2006.01) | |
| *H04W 12/02* | (2009.01) | |
| *H04M 1/60* | (2006.01) | |
| *H04W 76/10* | (2018.01) | |
| *H03M 13/39* | (2006.01) | |
| *H03M 3/02* | (2006.01) | |
| *H04W 84/18* | (2009.01) | |

(52) U.S. Cl.
CPC ........ *H04L 25/4906* (2013.01); *H04L 67/303* (2013.01); *H04M 1/6066* (2013.01); *H04W 12/02* (2013.01); *H04W 76/10* (2018.02); *H03M 3/024* (2013.01); *H04M 2250/02* (2013.01); *H04W 84/18* (2013.01)

(56) References Cited

U.S. PATENT DOCUMENTS

| | | |
|---|---|---|
| 2008/0144645 A1 | 6/2008 | Russell |
| 2009/0298420 A1 | 12/2009 | Haartsen |
| 2010/0324911 A1* | 12/2010 | Jougit .................. G10L 19/005 704/500 |
| 2013/0242810 A1* | 9/2013 | Garrett ..................... H04L 5/14 370/277 |

OTHER PUBLICATIONS

Notification of Transmittal of the International Search Report and the Written Opinion of the International Searching Authority, or the Declaration, for PCT/EP2016/069359, dated Nov. 7, 2016, 12 pages.

* cited by examiner

METHODS AND SYSTEMS FOR TRANSMISSION OF ARBITRARY DATA VIA BLUETOOTH HFP AUDIO CONNECTIONS WITH LOW LATENCY

CROSS REFERENCE TO RELATED APPLICATIONS

This application is a continuation of U.S. application Ser. No. 15/489,300, filed Apr. 17, 2017, entitled, "METHODS AND SYSTEMS FOR TRANSMISSION OF ARBITRARY DATA VIA BLUETOOTH HFP AUDIO CONNECTIONS WITH LOW LATENCY," which is a continuation of U.S. application Ser. No. 14/849,284, filed Sep. 9, 2015, entitled "METHODS AND SYSTEMS FOR TRANSMISSION OF ARBITRARY DATA VIA BLUETOOTH HFP AUDIO CONNECTIONS WITH LOW LATENCY," now U.S. Pat. No. 9,628,944, issued on Apr. 18, 2017, each of which is hereby incorporated herein in its entirety.

BACKGROUND

People communicate wirelessly and on the go. Among the devices that make this possible are those sometimes referred to as personal mobile devices. Examples of personal mobile devices include cell phones, smartphones, walkie-talkies, and portable hotspots, among others. A personal mobile device may be handheld (as may be the case for a walkie-talkie), body-mounted, or attached to a vehicle (such as the roof of a car), as examples.

Given the relative ease with which radio signals can be intercepted, communication with (or between) personal mobile devices is often encrypted to prevent interception of the communication by third parties. In voice communication, encryption is used to convert voice data into unintelligible data, while decryption is the process of converting the unintelligible data back to the original voice data, which can then be used to generate audible voice. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

Many devices communicate locally using Bluetooth protocols. Bluetooth is a standardized communication protocol for exchanging data over a short distance between devices. Typically, Bluetooth utilizes a band of frequencies between 2.4-2.485 GHz. Many communication profiles have been developed for Bluetooth, including Advanced Audio Distribution Profile (A2DP), Audio/Video Remote Control Profile (AVRCP), File Transfer Profile (FTP), Hands-Free Profile (HFP), Headset Profile (HSP), Personal Area Networking (PAN) Profile, as well as many others. Bluetooth is very popular for local communications due to low power consumption, up to 100 meters range, and ease of use.

SUMMARY

Described herein are methods and apparatus related to wireless binary data sequences. At least one embodiment takes the form of a method comprising receiving a bit pattern representative of a binary data sequence, generating a multi-bit data byte sequence that is representative of the bit pattern by outputting a multi-bit data byte that is larger than a byte-sequencer reference data byte according to a first criteria, and by outputting a multi-bit data byte that is larger than the byte-sequencer reference data byte according to a second criteria, encoding the generated multi-bit data byte sequence by, for each generated multi-bit data byte, outputting a single bit whose value is indicative of whether the generated multi-bit data byte is larger or smaller than a current reference multi-bit data byte, and updating that current reference multi-bit data byte based on the generated multi-bit data byte.

In at least one embodiment, the byte-sequencer reference data byte is updated with the larger-value data byte according to the first criteria, and the smaller-value data byte according to the second criteria.

In at least one embodiment, the bit pattern is generated via a pattern-setting function applied to the binary data sequence.

In at least one embodiment, each bit in the binary sequence is represented by a respective single bit in the bit pattern.

In at least one embodiment, each bit in the binary data sequence is represented by a string of multiple data bits in the bit pattern.

In at least one embodiment, the binary data sequence is encrypted audio data.

In at least one embodiment, encoding the generated multi-bit data byte sequence includes performing a Continuously Variable Slope Delta (CVSD) conversion.

At least one embodiment takes the form of an apparatus comprising a byte generator and an encoder. The byte generator is configured to receive a bit pattern representative of a binary data sequence, generate a multi-bit data byte representative of the bit pattern, and for at least one bit in the bit pattern, output a multi-bit data byte larger than a current byte-sequencer data byte according to a first criteria, and output a multi-bit data byte smaller than a current byte-sequencer data byte according to a second criteria. The encoder is configured to encode the generated multi-bit data byte sequence by, for each generated multi-bit data byte, outputting a single bit whose value is indicative of whether the generated multi-bit data byte is larger or smaller than a current reference multi-bit data byte and updating the current reference multi-bit data byte based on the generated multi-bit data byte.

In at least one embodiment, the encoder is further configured to maintain a step size and, responsive to the consecutive output of single bits of the same value, change the value of the step size.

In at least one embodiment, the generator is configured to output a larger-valued multi-bit data byte by outputting a multi-bit data byte with a value equal to the current byte-sequencer reference data byte plus the step size, and output a smaller-valued multi-bit data byte by outputting a multi-bit data byte with a value equal to the current byte-sequencer reference data byte minus the step size.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

Various example embodiments are described herein with reference to the following drawings, in which like numerals denote like entities, and in which.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities may carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
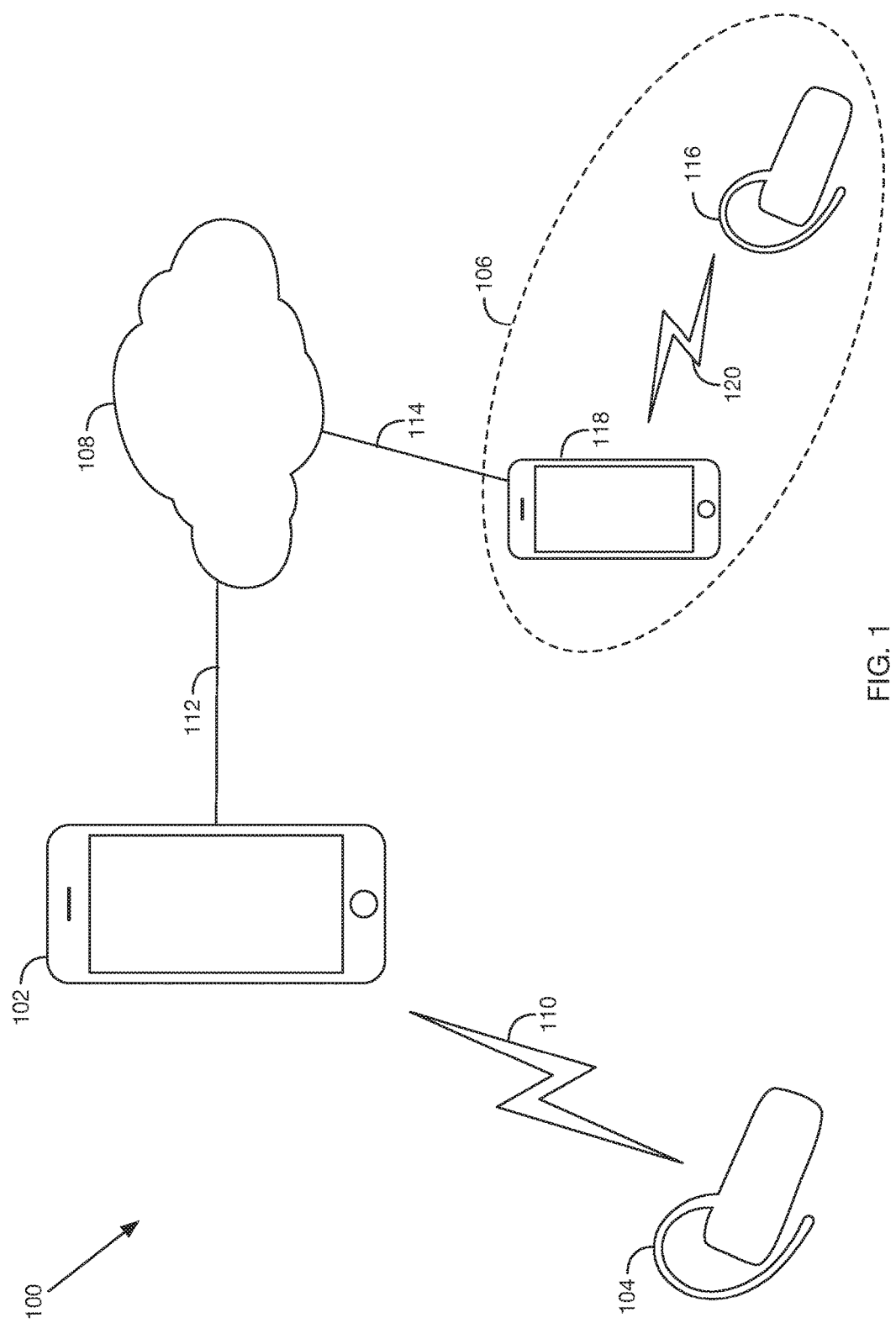
FIG. 1 depicts a communication system, in accordance with at least one embodiment.

FIG. 1 depicts a communication system, in accordance with at least one embodiment. As shown, a communication system 100 includes a communication device 102, a local endpoint 104, and a remote endpoint 106.

Communication device 102 may take the form of, for example, a personal computer, a desktop computer, a laptop computer, a notebook computer, a tablet computer, a handheld computer, a wearable computer, a personal digital assistant (PDA), a feature phone, an optical head-mounted display (OHMD), and/or a smart watch, among numerous other possibilities that will be known to those of skill in the art. In the embodiment illustrated in FIG. 1, communication device 102 takes the form of a smartphone. In some embodiments, communication device 102 may be integrated into a vehicle, such as a Bluetooth supported automobile, aircraft, watercraft, Local endpoint 104 may take the form of a headset (such as a Bluetooth headset), a communication-device-mounted accessory (such as a case or sleeve), and/or any other entity capable of carrying out the local-endpoint functions described herein.

As shown in FIG. 1, communication device 102 is communicatively connected to local endpoint 104 via a local communication link 110 In an embodiment, the local communication link takes the form of a Bluetooth communication link, though the link may take other forms as well.

Remote endpoint 106 may be any suitable device (or combination of devices) configured to perform the remote-endpoint functions described herein. In the embodiment illustrated in FIG. 1, remote endpoint 106 takes the form of a remote-endpoint communication device 118 and a remote-endpoint accessory 116 that are communicatively connected via a communication link 120. Accessory 116, device 118, and communication link 120 may be similar in function and/or structure to local endpoint 104, communication device 102, and local communication link 110 (respectively), as examples. In other configurations, remote endpoint 106 may take the form of a cryptographic phone, a private branch exchange (PBX), an Internet protocol PBX (IP-PBX), and/or any other entity capable of carrying out the described remote-endpoint functions.

Communication device 102 may provide local-endpoint media-session control data to local endpoint 104 via the local communication link. The local-endpoint media-session control may be based on the media-session control data, for example, and may include a cryptographic key (e.g., a public key), a digital signature (e.g., of a cryptographic key and/or of media-session payload data), media-session metadata, and/or payload-data metadata, among other possibilities. Such local-endpoint media-session control data may be used to by local endpoint 104 for encrypting and/or decrypting media-session payload data for example.

In an embodiment, local communication link 110 takes the form of a Bluetooth communication link and providing local-endpoint media-session control data to local endpoint 104 via the local communication link takes the form of providing the local-endpoint media-session control data via the Bluetooth communication link. Providing the local-endpoint media-session control data via the Bluetooth communication link may include providing the local-endpoint media-session control data according to a second Bluetooth profile that is different from the first Bluetooth profile. The second Bluetooth profile may take the form of (or include) a Serial Port Profile (SPP) and/or a non-audio Bluetooth profile, as examples.

Figure 2:
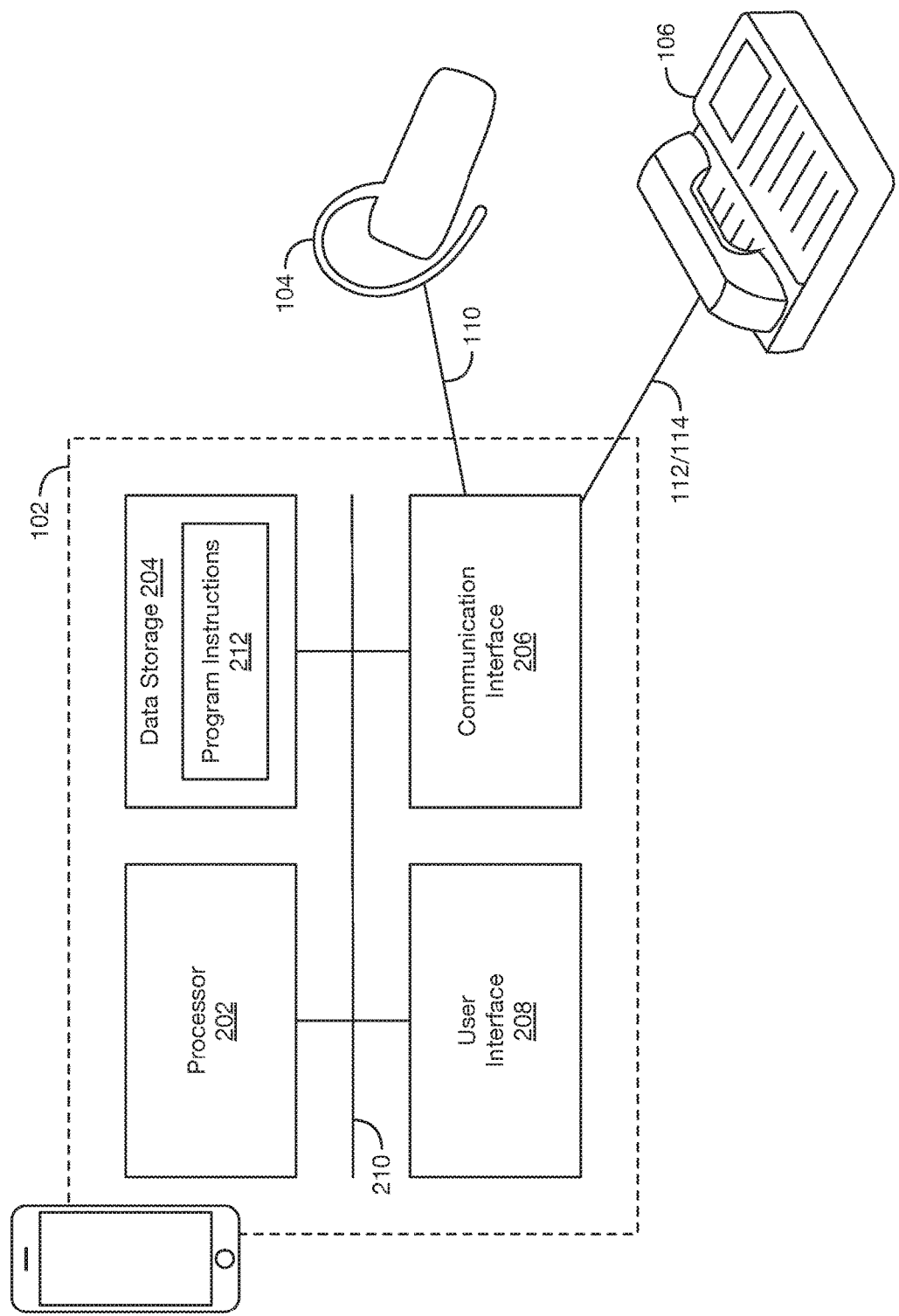
FIG. 2 depicts a block diagram of a communication device, in accordance with at least one embodiment.

FIG. 2 depicts a block diagram of a communication device, in accordance with at least one embodiment. As shown, communication device 102 includes a processor 202, data storage 204, a communication interface 206, and a user interface 208, each of which is interconnected via a system bus 210. In the embodiment illustrated in FIG. 1, remote endpoint 106 takes the form of a cryptographic desk phone. Those having skill in the relevant art will appreciate that communication device 102 may have additional and/or different components, and perhaps a different arrangement of components, among many other possible variations that may be listed here.

Processor 202 may include one or more processors of any type deemed suitable by those of skill in the relevant art, some examples including a microprocessor, an application-specific integrated circuit (ASIC), and a digital signal processor (DSP).

Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art may be used.

As depicted in FIG. 2, data storage 204 contains program instructions 212 which are executable by processor 202 for carrying out various functions, though data storage 204 may contain different and/or additional data. In an embodiment in which communication device 102 is configured to carry out one or more processes and/or functions (such as the processes and functions described with reference to FIG. 1), program instructions 212 are executable by processor 202 for carrying out those functions. In instances where other entities described herein have a structure similar to that of communication device 102 as described in connection with at least FIG. 3, the respective program instructions 212 stored by the respective data storages 204 of those respective devices are executable by their respective processors 202 to carry out functions performed by those devices.

Communication interface 206 may include any necessary hardware (e.g., chipsets, antennas, Ethernet cards, etc.) and/or software for conducting one or more forms of communication with one or more other components and/or entities (such as local endpoint 104 and remote endpoint 106, as examples). Communication interface 206 may be configured to communicate according to one or more protocols such as Bluetooth, NFC, Infrared Data Association (IrDA), ZigBee, Wi-Fi, Universal Serial Bus (USB), IEEE 1394 (FireWire), and/or IEEE 802.3 (Ethernet)), as examples.

User interface 208 may include one or more displays, touchscreens, loudspeakers, microphones, dial keys, buttons, switches, light emitting diodes (LEDs), and the like. One or more user-interface components (e.g., an interactive touchscreen-and-display component) may provide both user-input and user-output functionality. And other user-interface components may be implemented in a given context, as known to those of skill in the art.

Figure 3:
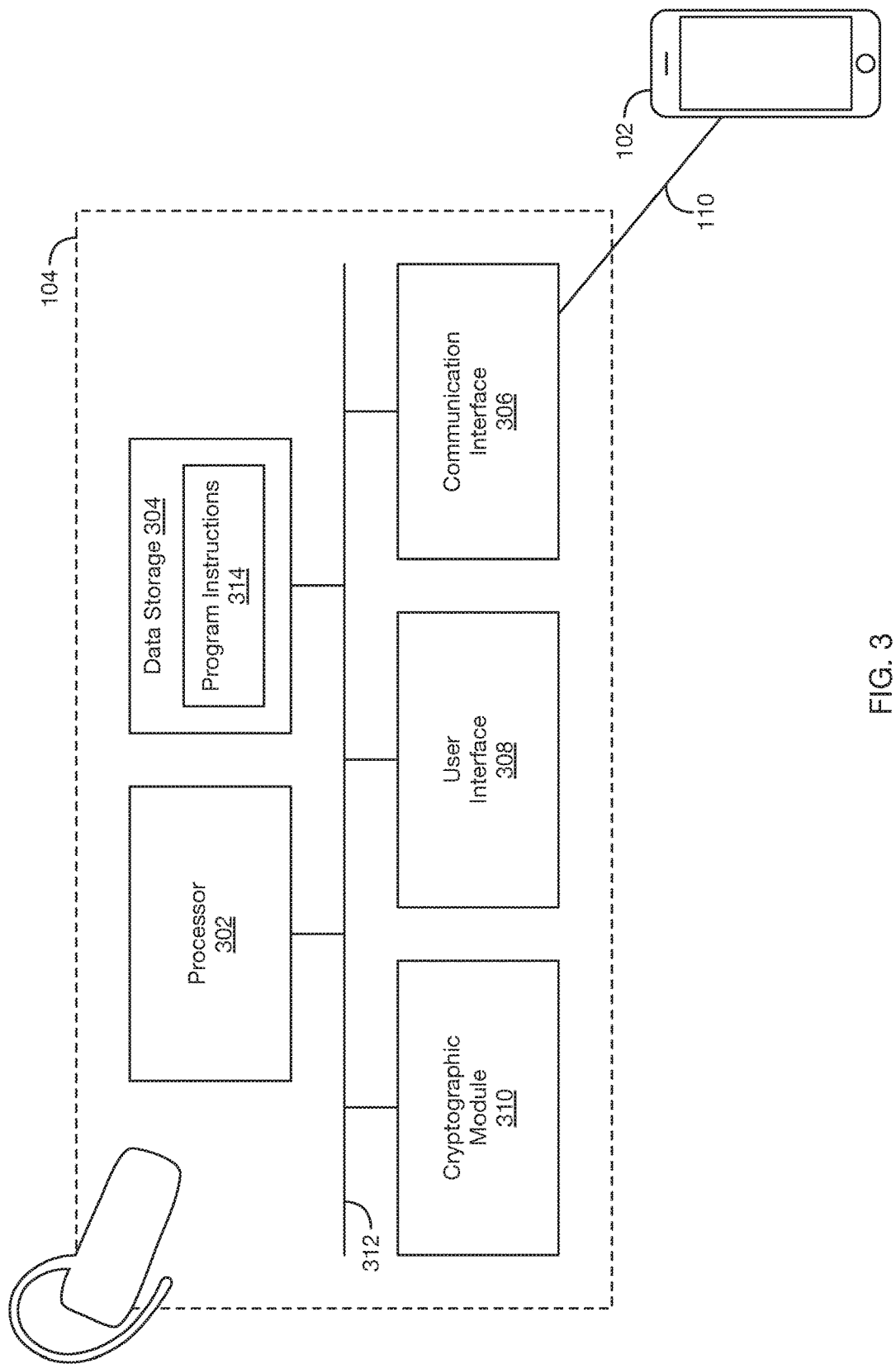
FIG. 3 depicts a block diagram of a local endpoint, in accordance with at least one embodiment.

FIG. 3 depicts a block diagram of a local endpoint, in accordance with at least one embodiment. As shown, local endpoint 104 includes a processor 302, data storage 304, a local communication interface 306, a user interface 308, and a cryptographic module 310, each of which is interconnected via a system bus 312. Those having skill in the relevant art will appreciate that local endpoint 104 may have additional and/or different components, and perhaps a different arrangement of components, among many other possible variations that may be listed here. Processor 302, data storage 304, local communication interface 306, and/or user interface 308 may function in a manner similar to the similarly-named entities of communication device 102, as described (for example) with respect to FIG. 2 above.

Cryptographic module 310 may include hardware and/or software for performing cryptographic functions or processes—e.g., encryption, decryption, signature generation, signature verification, and/or key generation. In an embodiment, cryptographic module 310 is contained within an explicitly defined perimeter that establishes the physical bounds of the cryptographic module and that contains any processors and/or other hardware components that store and protect any software and firmware components of the cryptographic module. Cryptographic module 310 may take the form of (or include) a secure crypto-processor, a smart card, a secure digital (SD) card, a micro SD card, a subscriber identity module (SIM) card, and/or any other cryptographic module, as known to one of skill in the art.

CVSD CODEC

Figure 4A:
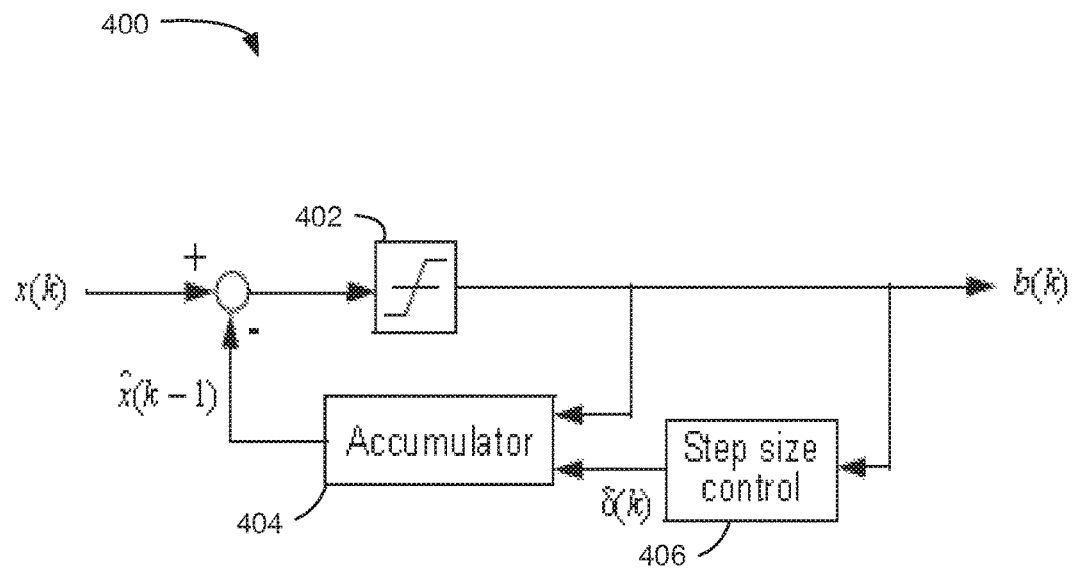
FIG. 4A depicts a prior art example of a Continuous Variable Slope Delta (CVSD) encoder.

In at least one embodiment, local endpoint 104 communicates with communication device 102 using a Bluetooth Hands-Free Profile (HFP). In some embodiments, the HFP uses a protocol known to those of skill in the art as Continuously Variable Slope Delta (CVSD) modulation, which is utilized to communicate audio data from the Bluetooth device to the communication device (or vice versa). Embodiments herein describe use of a CVSD modulation protocol, however it is known to those of skill in the art that minor modifications can be made to provide embodiments for other audio-based codecs. FIG. 4A depicts an example block diagram of a known CVSD encoder 400. As shown multi-bit data byte input x(k) enters combination unit 402 along with the multi-bit data byte reference sample stored within accumulator 404 $\hat{x}$ (k−1). b(k) corresponds to a bit representing the sliced output of the comparison (i.e. b(k)=sgn(x(k)−$\hat{x}$(k−1), where sgn(x) corresponds to the sign function e.g. sgn(x)=1 for x≥0, otherwise sgn(x)=−1). The accumulator 404 then reads in the value b(k) and a step size control signal δ(k), which adds or subtracts δ(k) from the current reference sample of the accumulator 404 if b(k) is +1 or −1, respectively, thus updating the reference sample within the encoder. Step-size control unit 406 monitors b(k) (e.g. for consecutive '1' or '0' outputs) and adjusts the magnitude of δ(k) accordingly. A new input x(k) is read in and the process repeats. In a standard CVSD system, input x(k) can be a multi-bit byte read in at 64 kHz, while b(k) is a single bit stream output at a rate of 64 kHz.

Figure 4B:
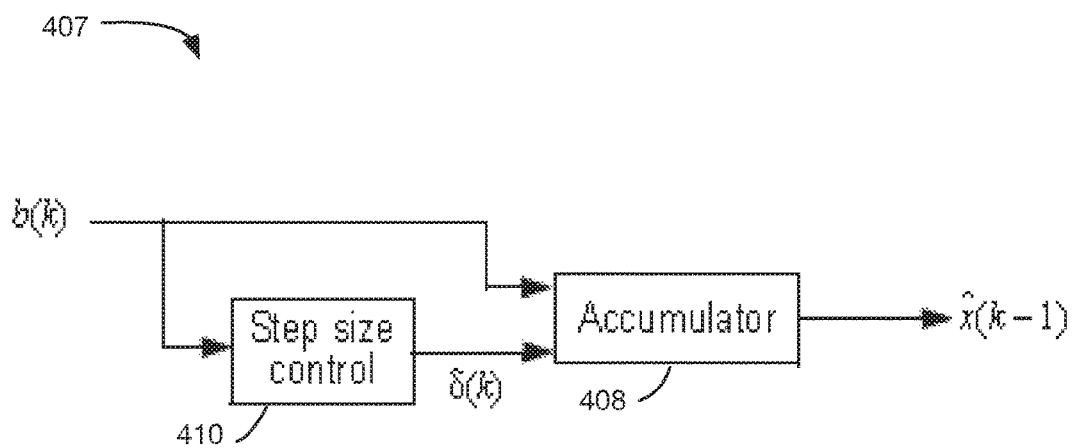
FIG. 4B depicts a prior art example of a CVSD decoder.

FIG. 4B depicts an example block diagram of a known CVSD decoder 407. The decoder receives the single bit stream b(k) at a rate of 64 kHz. The decoder also includes an accumulator 408, which is initialized to be equal to the accumulator 404 in the encoder. In some embodiments, the accumulator is shared between the encoder and decoder for a single CODEC. In some embodiments, out of sync references may converge over time due to a decay factor associated with the accumulators. The reference sample within accumulator 408 is incremented/decremented based on the step size δ(k) and the input bit b(k). The step-size control unit 410 of the decoder is synchronized to the step-size control unit 406 of the encoder. Similar to the accumulator, a single CVSD CODEC may share a step-size control unit. In some embodiments of CVSD, a multi-bit data byte stream may be output from accumulator 408 at a rate of 64 kHz. In other embodiments (such as in some Bluetooth profiles), the multi-bit data bytes are output at a rate of 8 kHz.

In at least one embodiment, it is desired to transmit binary data, or perhaps encrypted binary data, rather than raw audio data. As is known to one of skill in the art, the method of CVSD described above may provide an output that is an approximated multi-bit byte data stream, however the output of the CVSD decoder will not be exactly the same as the data input to the CVSD encoder. Thus, if one attempts to send data over such a link, this would cause data errors. Therefore, modifications must be made in order to achieve perfect reconstruction of the sent data.

Example System Architecture

Figure 5:
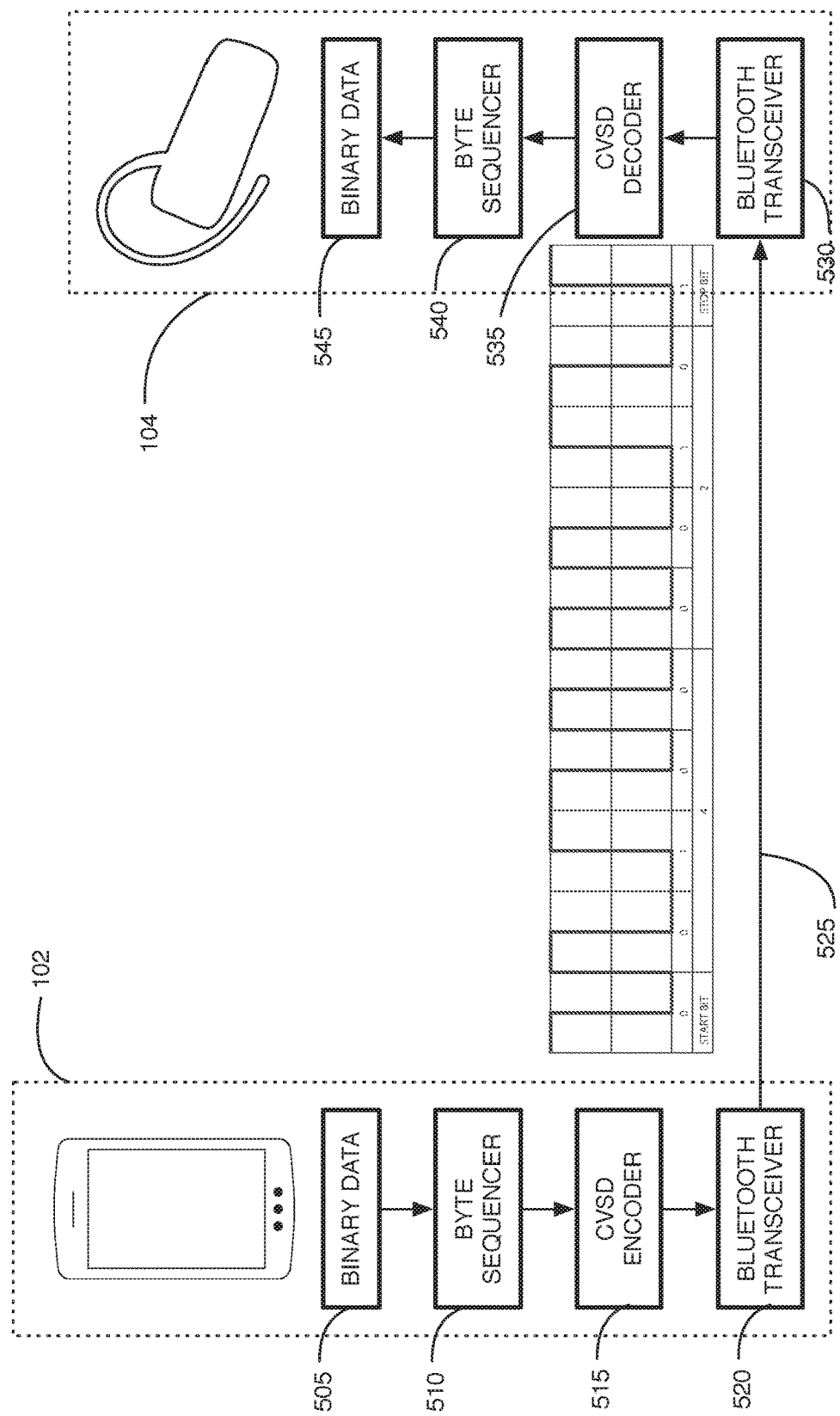
FIG. 5 depicts a system in accordance with at least one embodiment.

FIG. 5 depicts an apparatus in accordance with at least one embodiment. As shown, FIG. 5 includes a communication device 102 and a local endpoint 104. As shown, communication device 102 includes byte sequencer 510, CVSD Encoder 515, and Bluetooth transceiver 520. Local endpoint 104 includes byte sequencer 540, CVSD Decoder 535, and Bluetooth transceiver 530. FIG. 5 depicts data being sent from communication device 102 to local endpoint 104 for clarity, however it is understood that the embodiments include bi-directional communication.

As shown, communication device 102 provides a binary data sequence 505 to byte sequencer 510. In at least one embodiment, binary data sequence 505 is a single bit-wide serial stream. In at least one embodiment, binary data sequence 505 represents encrypted data. In a further embodiment, the encrypted data represents encrypted audio. Byte sequencer 510 is configured to receive binary data 505, and responsively generate a multi-bit byte sequence. The CVSD encoder 515 receives the multi-bit byte sequence and responsively generates a one-bit per-sample binary sequence 525 representing the binary data sequence. Each bit in the one-bit per-sample binary sequence 525 indicates whether a received multi-bit data byte is larger or smaller than a prior output reference byte. The one-bit per-sample binary sequence 525 is transmitted via Bluetooth transceiver 520 to Bluetooth transceiver 530 at local endpoint 104. CVSD decoder 535 receives the one-bit per-sample binary sequence and responsively generates a multi-bit data byte sequence. The multi-bit data byte sequence is received by byte sequencer 540, which responsively generates a binary data sequence 545, which is a replicated version of binary data sequence 505.

Figure 6:
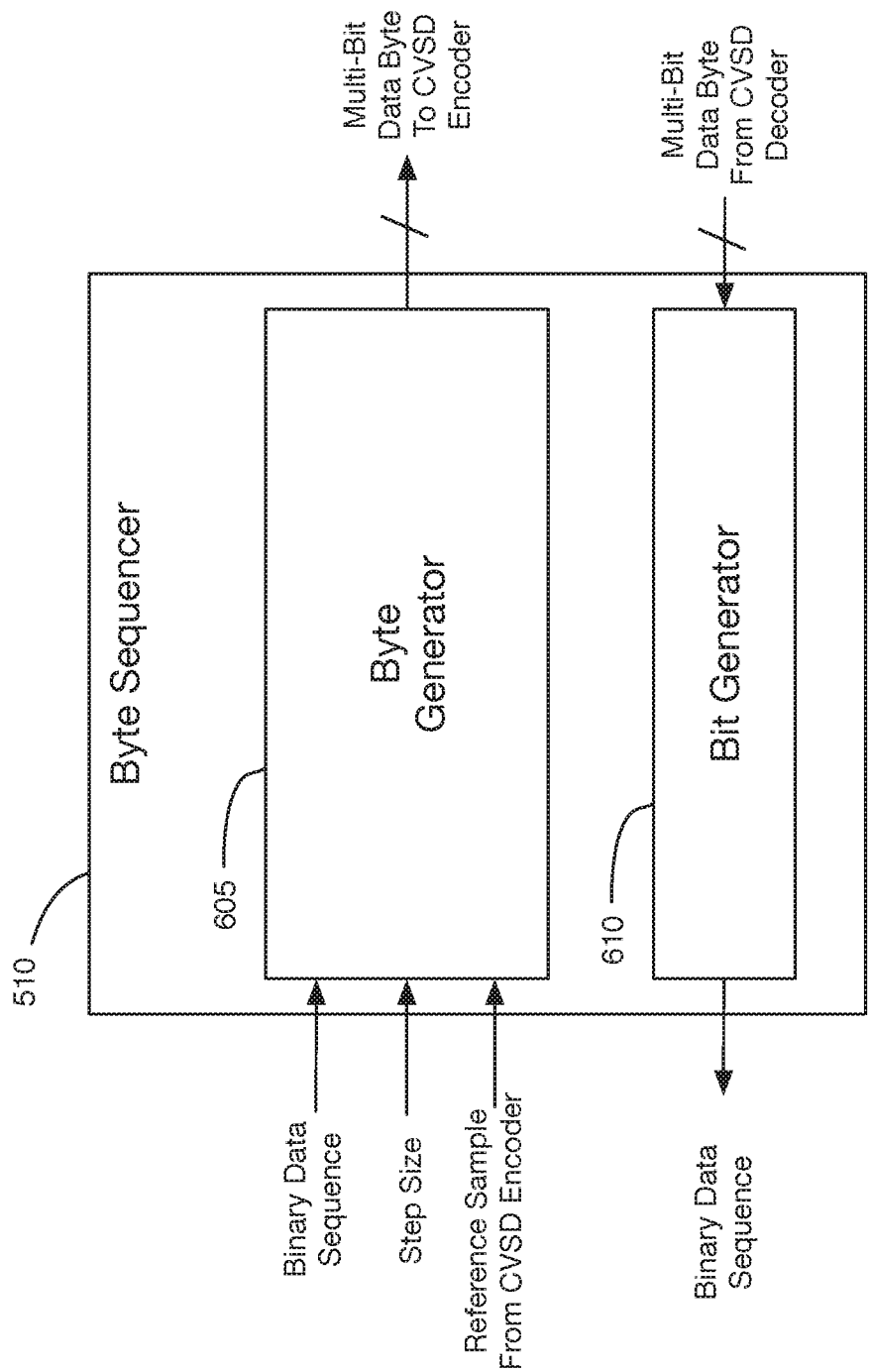
FIG. 6 depicts a block diagram of a byte sequencer, in accordance with at least one embodiment.

FIG. 6 depicts byte sequencer 510, in accordance with at least one embodiment. As shown, byte sequencer 510 includes a byte generator 605 and a bit generator 610. It should be noted that byte sequencer 510 might include any combination of components shown, as well as additional components as known to one of skill in the art. In at least one embodiment, byte generator 605 is configured to receive a bit of a binary data sequence and responsively generate a multi-bit data byte of a multi-bit data byte sequence to be sent to a CVSD encoder. In at least one embodiment, bit generator 610 is configured to receive a multi-bit data byte of a multi-bit data byte sequence from a CVSD decoder and responsively generate a bit of a binary data sequence. In some embodiments, byte generator 605 may receive step size information in order to account for a step/increment size used by the CVSD CODECs due to repeated bits when generating multi-bit data bytes. In some embodiments, byte generator 605 may receive the value of the current reference sample within the CVSD CODEC as a reference (or feedback) when generating the next multi-bit data byte.

Figure 7:
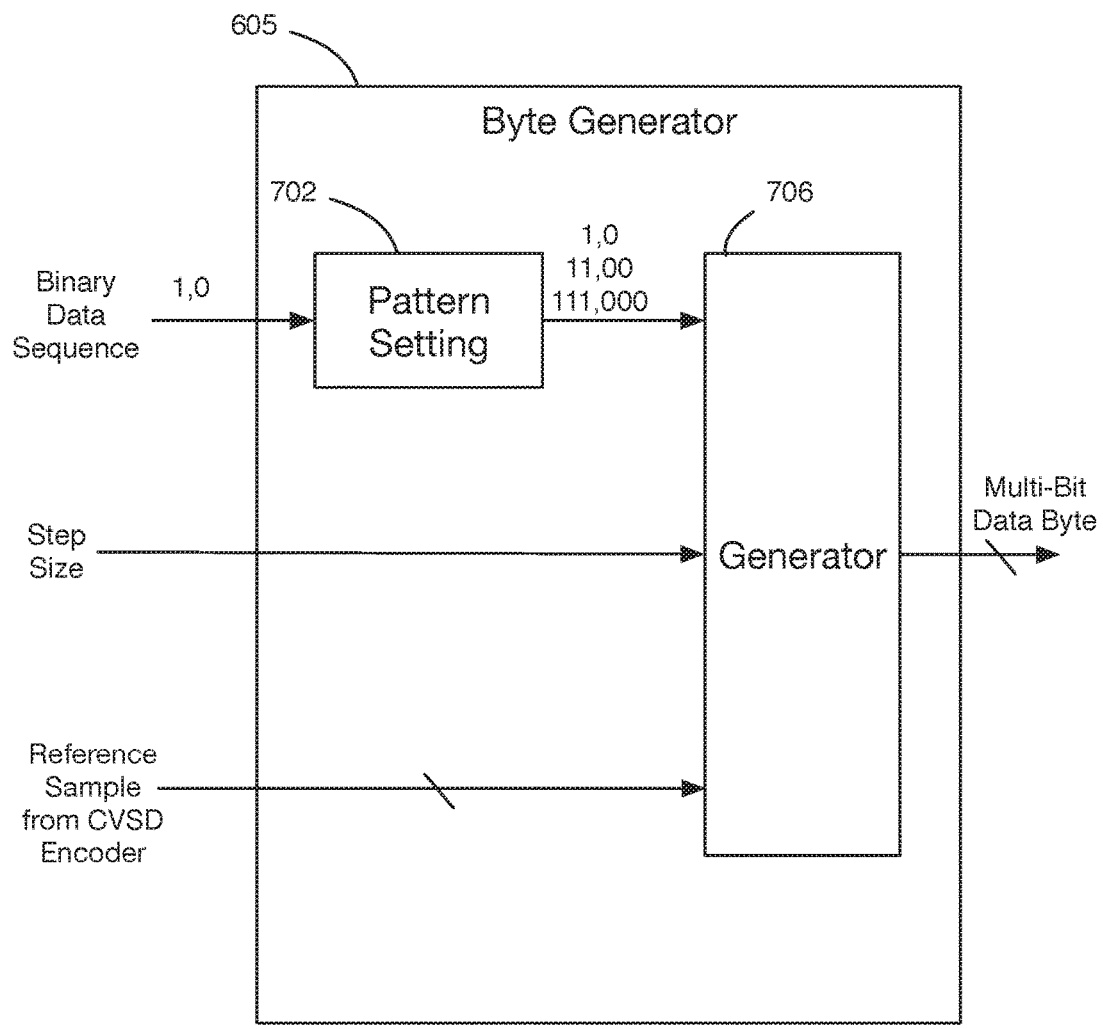
FIG. 7 depicts a block diagram of a byte generator, in accordance with at least one embodiment.

FIG. 7 depicts byte generator 605, in accordance with at least one embodiment. As shown, byte generator 605 includes pattern-setting module 702 and generator 706. It should be noted that byte generator 605 might include the combination of components shown, as well as any additional components as known to one of skill in the art. Generator 706 receives at least one input and responsively generates a multi-bit data byte. In at least one embodiment, pattern-setting module 702 receives a single bit of a binary data sequence and generates a bit sequence pattern representing the single bit of received binary data sequence 505 to be used by generator 706 when forming multi-bit data bytes. In some embodiments, the bit sequence pattern is output from pattern-setting module 702 at a faster rate than the rate at which pattern-setting module 702 receives each bit of the binary data sequence (e.g. if each single bit is received at 32 kHz, then pattern-setting module may generate pairs of bits, each bit of the pair of bit at a rate of 64 kHz to maintain the same throughput). In at least one embodiment, each bit of the one-bit per-sample binary sequence is represented by a sequence pattern of two or more bits. Depending on how many bits in the sequence pattern of two or more bits, as well as what the sequence pattern is (e.g. 111, 000, 101, 010), generator 706 may need to generate multi-bit data bytes that have a larger/smaller difference between them. Examples of different binary data sequence patterns are given in paragraphs below. In at least one embodiment, pattern-setting module 702 provides a single binary bit to generator 706 to indicate whether the next multi-bit data byte needs to be larger or smaller than the previously transmitted data byte. In at least one embodiment, generator 706 receives the value of the current reference sample of the CVSD encoder in order to generate the next multi-bit data byte. In some embodiments, the byte generator may include a reference register configured to store a previously generated multi-bit data byte in order to generate the next multi-bit data byte. In at least one embodiment, generator 706 may also receive an input indicating a current step size used by the CVSD CODECs to ensure a sufficient magnitude is used in generating multi-bit data bytes.

Figure 8:
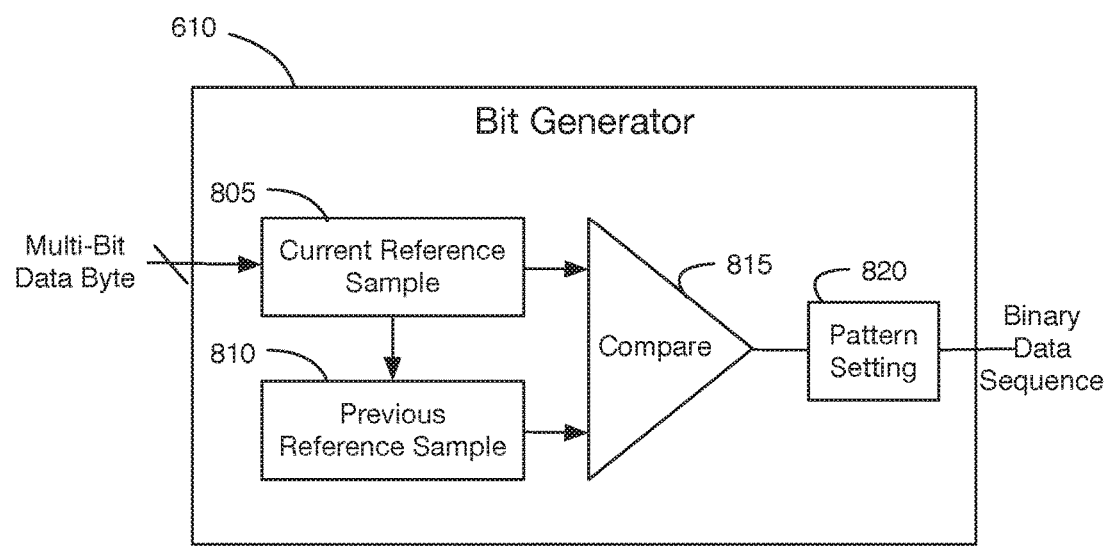
FIG. 8 depicts a block diagram of a bit generator, in accordance with at least one embodiment.

FIG. 8 depicts bit generator 610, in accordance with at least one embodiment. As shown, bit generator 610 includes current reference sample 805, previous reference sample 810, and compare unit 815. Current reference sample 805 and previous reference sample 810 may be stored within registers, as electrical charges on capacitors, or any other way known to one of skill in the art. Compare unit accepts the current reference sample 805 from the CVSD decoder and compares it to the previous reference sample 810 using compare unit 815 and outputs a single bit based on the result. In at least one embodiment, the comparator unit 815 outputs a binary '1' if the current data byte is larger than the previous data byte, and outputs a binary '0' if the previous data byte is larger than the current data byte. The current reference sample 805 is then stored as the previous reference sample 810 before a new multi-bit data byte is read in from the CVSD decoder. In some embodiments, bit generator 610 includes a pattern-setting module 820 which may be similar in architecture to pattern-setting module 702 within byte generator 605.

Embodiments

In the following embodiments, it is assumed that the one-bit per-sample binary sequence transmitted between Bluetooth receivers is transmitted at a rate of 64 kHz. However, the rate at which the CVSD CODECs sample/output multi-bit data bytes may vary, thus limiting the overall throughput. In at least one embodiment, each bit of the one-bit per-sample binary sequence is represented by a sequence pattern of one or more bits output from the CVSD encoder during one sample period. The following paragraphs give embodiments utilizing different CODEC receive/output rates.

Figure 9A:
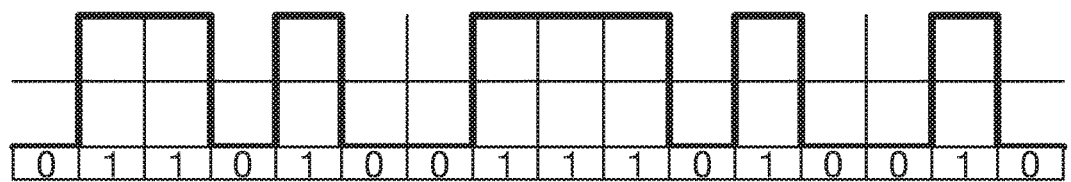
FIGS. 9A-9D depict example one-bit per-sample binary sequences, in accordance with at least one embodiment.

In a first embodiment, the CVSD CODECs are configured to sample/output a multi-bit data byte sequence at a rate of 64 kHz. Referring to FIG. 5, byte sequencer 510 receives binary data sequence 505 at a throughput of 64,000 bits per second (bps) (which also may be denoted as 64 kbps herein) and outputs multi-bit data bytes at 64 kHz. In some embodiments, the multi-bit data bytes include 8-16 bit bytes, however other size bytes are possible. CVSD encoder 515 samples each multi-bit data byte at 64 kHz and outputs a one-bit per-sample binary sequence 525 at 64 kHz, which is transmitted to local endpoint Bluetooth transceiver 530 via communication device Bluetooth transceiver 520. In this embodiment, each bit of the one-bit per-sample binary sequence corresponds to a respective bit output by CVSD encoder 515. CVSD decoder 535 receives bits of the one-bit per-sample binary sequence at a rate of 64 kHz, increments/decrements a stored reference multi-bit data byte based on each received bit, and outputs the stored multi-bit data byte at a rate of 64 kHz. Byte sequencer 540 receives each stored multi-bit data byte at a rate of 64 kHz and responsively generates a binary data sequence 545 at a rate of 64 kHz. FIG. 9A depicts an example of a one-bit per-sample binary sequence 525 in accordance with at least one embodiment, wherein each bit of the one-bit per-sample binary sequence 535 is represented by a single bit output from the CVSD encoder 515. In some embodiments, binary data sequence 505 is provided at a rate of 32 kHz to byte sequencer 510. Byte sequencer 510 may then form a sequence pattern of a pair of bits at a rate of 64 kHz (e.g. using pattern-setting module 702 described above), where each pair of bits represents a single bit of binary data sequence 505. The transmission process remains the same, except byte sequencer 540 may output bits at a rate of 32 kHz, using a pattern-setting module similar to that used by byte-sequencer 510. Other embodiments may further reduce the throughput of binary data sequence 505 and encode each bit in three, four, or more bit sequence patterns, at the benefit of improved accuracy of the data at the receiving end. Example pattern sequences that may be used are given in examples below.

In a second embodiment, at least one of the CVSD CODECs is configured to sample/output a multi-bit data byte sequence at a rate of 32 kHz while maintaining transmission of the one-bit per-sample binary sequence at a rate of 64 kHz.

Case 1

Figure 9B:
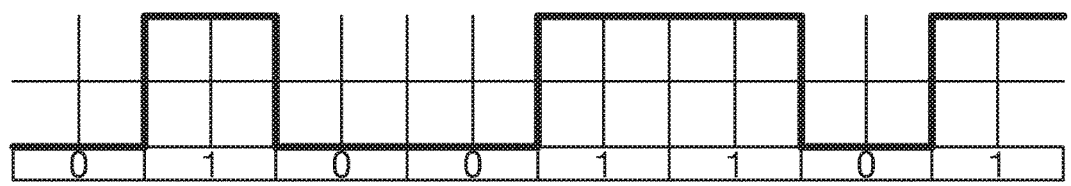
Figure 9C:
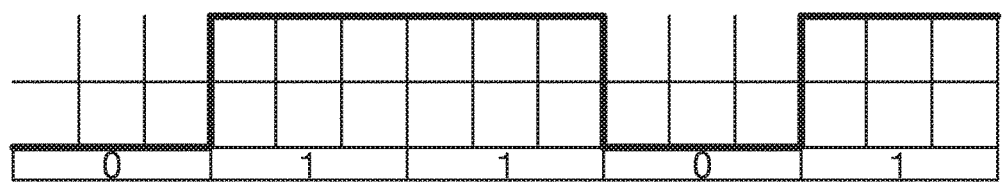
Figure 9D:
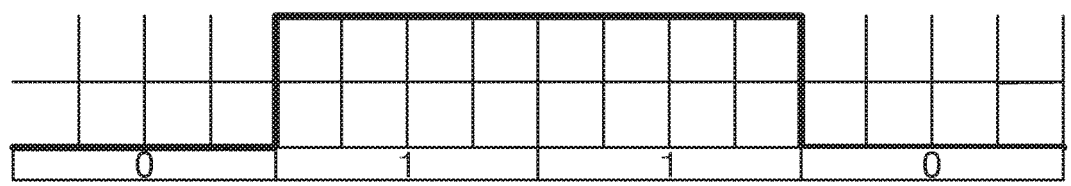

In a first case, both the CVSD encoder 515 and CVSD decoder 535 operate at 32 kHz. This will limit the overall throughput to 32,000 bps, since CVSD decoder 535 can only output multi-bit data bytes to byte sequencer 540 at a rate of 32 kHz, and therefore the byte sequencer 540 can only output bits at an effective rate of 32 kbps. Binary data sequence 505 may be provided to the byte sequencer 510 at a rate of 32 kHz (for a throughput of 32 kbps), while byte sequencer 510 is configured to output multi-bit data bytes at a rate of 32 kHz. In this embodiment, the CVSD encoder samples each byte at a rate of 32 kHz and outputs a binary sequence pattern represented as a pair of bits per multi-bit data byte at a rate of 64 kHz. In at least one embodiment, each bit of the one-bit per-sample binary sequence is represented by a pair of bits, (i.e. each pair of bits representing a binary '0' or '1'), resulting in the expected throughput of 32 kbps. CVSD decoder 535 is configured to receive the pairs of bits of the one-bit per-sample binary sequence 525 at a rate of 64 kHz, analyze each pair of bits in the sequence, and output a multi-bit data byte sequence at a rate of 32 kHz. FIG. 9B depicts an example one-bit per-sample binary sequence in accordance with one embodiment, wherein each bit of the one-bit per-sample binary sequence is represented as a sequence pattern of a pair of bits. In this embodiment, a binary '1' is represented by a sequence pattern of a pair of bits '11' whereas a binary '0' is represented by a sequence pattern of a pair of bits '00'. In at least one embodiment, if a phase of the CVSD decoder is off, then byte sequencer 510 can be configured to insert a dummy bit into the one-bit per-sample binary sequence to realign the phase. In at least one embodiment, if the CVSD decoder 535 is configured to detect sequence of '00' and '11', but receives a sequence '10' or '01', then the byte sequencer 510 can be configured to hold a received binary data bit of binary data sequence 505 for a half a sample (¹⁄₆₄k) before outputting the multi-bit data byte corresponding to the held sample, thus inserting a dummy bit in so that the CVSD decoder 535 is realigned and receiving exclusively '11' and '00' sequences again. Other methods of inserting dummy bits may also be used that would be known to one of skill in the art. Table 1 shows possible binary sequence patterns of pairs of bits that may be used for binary values of '1' and '0' in accordance with at least one embodiment:

TABLE 1

| '0' | '1' |
|-----|-----|
| 00  | 11  |
| 10  | 01  |
| 01  | 10  |
| 11  | 00  |

Case 2

In a second case, the CVSD encoder 515 is configured to receive multi-bit data bytes at a rate of 32 kHz, while the CVSD decoder 535 is configured to output multi-bit data bytes at a rate of 64 kHz. In this case, the binary data stream 505 entering byte sequencer 510 may have a maximum throughput of 32,000 bps (e.g. single bits at 32 kHz or a pattern sequence of pairs of bits at 64 kHz wherein one pair of bits represents a single information bit). The byte sequencer 510 receives the binary data stream 505 and outputs a multi-bit data byte sequence at a rate of 32 kHz, which is received by CVSD encoder 515. The CVSD encoder then outputs a sequence pattern of a pair of bits (as described above) based on each received multi-bit data byte and the current value of the reference sample within the CVSD encoder 515 at a rate of 64 kHz. The 64 kHz one-bit per sample binary sequence 525 produced by CVSD encoder 515 is transmitted via Bluetooth transceiver 520 to Bluetooth transceiver 530. CVSD decoder 535 receives the 64 kHz one-bit per sample binary sequence 525 and outputs multi-bit data byte sequence at a rate of 64 kHz. The byte sequencer 540 receives the multi-bit data byte sequence and outputs binary data stream 545 at an effective throughput of 32,000 bps. In one embodiment, byte sequencer 545 is configured to analyze two consecutive multi-bit data bytes and output binary data stream 545 as a 32 kHz stream of bits. In another embodiment, byte sequencer 540 outputs binary data stream 545 as a 64 kHz stream of sequence patterns of pairs of bits, each pair of bits corresponding to one bit within binary data stream 505 (in the case of a single bit stream at 32 kHz), and further pattern identification is done by a processor, for example.

Case 3

In a third case, the CVSD 515 encoder is configured to receive multi-bit data bytes at a rate of 64 kHz, while the CVSD decoder 535 is configured to output multi-bit data bytes at a rate of 32 kHz. In this case, binary data sequence 505 is again transmitted at an effective throughput of 32,000 bps. Binary data sequence 505 is received by byte sequencer 510, which in turn outputs a multi-bit data byte sequence at a rate of 64 kHz (e.g., a pair of consecutive multi-bit data bytes represents a single bit of binary data sequence, or each bit of binary data sequence 505 is transmitted as a sequence pattern of a pair of bits). CVSD encoder 515 receives the multi-bit data byte sequence and outputs the one-bit per sample binary sequence 525 at a rate of 64 kHz, which is transmitted via Bluetooth transceiver 520 to Bluetooth transceiver 530. CVSD decoder 535 receives the one-bit per sample binary sequence 525 and outputs a multi-bit data byte sequence at a rate of 32 kHz, after which byte sequencer 540 converts the 32 kHz multi-bit data byte sequence into a 32 kHz single bit stream.

Many other transmission rate configurations (as well as combinations between transmitter/receiver) for CVSD CODECs may be available, in which case each bit of binary data sequence 505 may be represented by various different bit sequence patterns. For example, in some embodiments, the overall throughput may be limited to 21,333 bps, in which case each bit of binary data sequence 505 may need to be represented as a sequence pattern of 3 bits. Table 2 below shows possible sequence patterns that may be used for binary values of '1' and '0', in accordance with some embodiments. Note that Table 2 does not provide an exhaustive list of options, and other sequence patterns may be used as known to one of skill in the art:

TABLE 2

| '0' | '1' |
|-----|-----|
| 000 | 111 |
| 010 | 101 |
| 100 | 011 |
| 001 | 110 |

Another embodiment may utilize an overall throughput of 16,000 bps, in which case each binary data sequence 505 may be represented as a sequence pattern of 4 bits. Table 3 below shows possible sequence patterns that may be used for binary values of '1' and '0', in accordance with some embodiments. Note that Table 3 does not provide an exhaustive list of options, and other sequence patterns may be used as known to one of skill in the art:

TABLE 3

| '0' | '1' |
|------|------|
| 0000 | 1111 |
| 0011 | 1100 |
| 1010 | 0101 |
| 1001 | 0110 |
| 1000 | 0111 |
| 0001 | 1110 |

Figure 10:
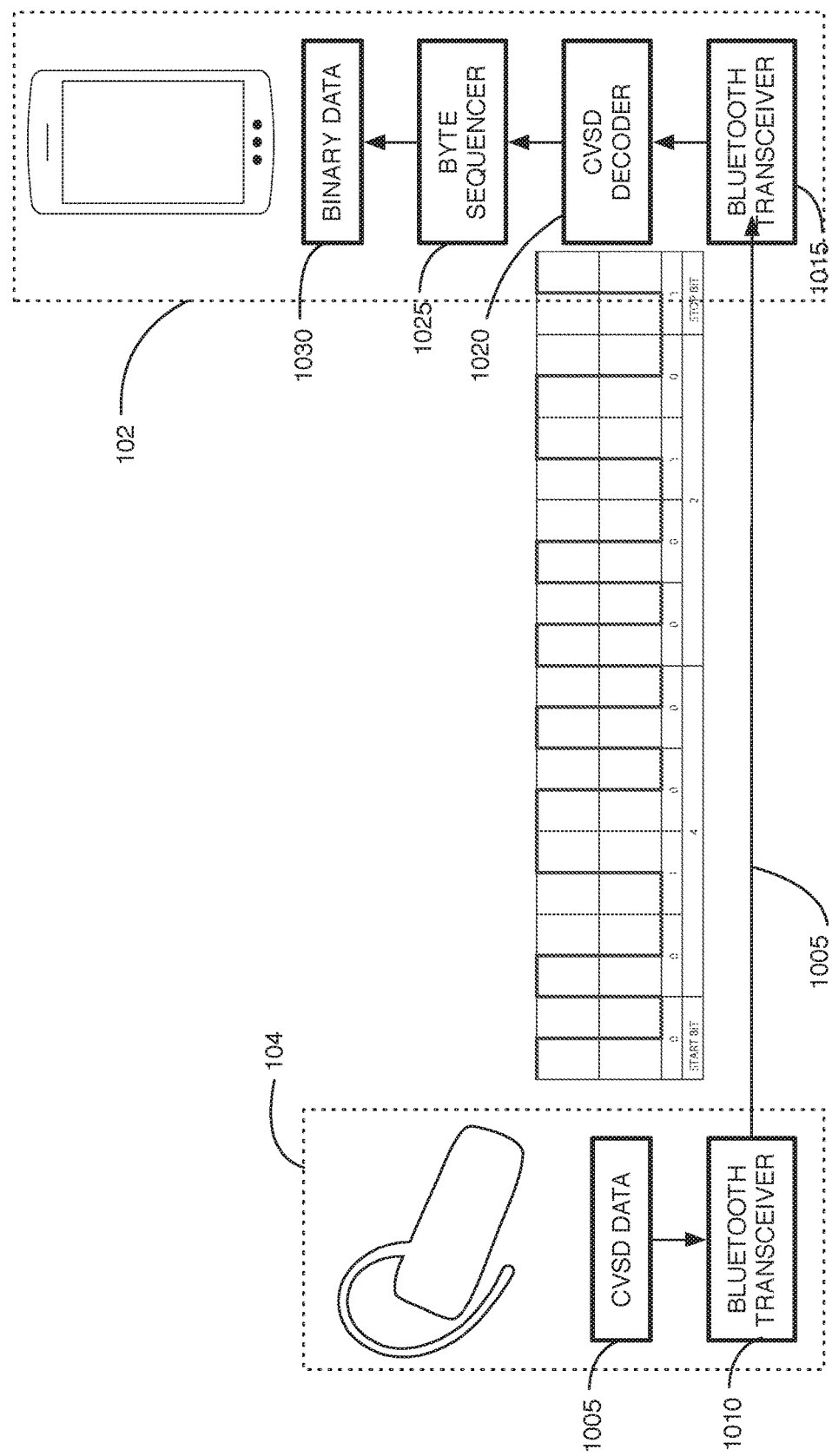
FIG. 10 depicts a system in accordance with at least one embodiment.

In at least one embodiment, local endpoint 104 may not include any sort of audio-codec, and may be configured to generate/receive the one-bit per-sample binary sequence directly. FIG. 10 depicts a system in accordance with at least one embodiment. As shown, FIG. 10 includes local endpoint 104, which includes CVSD data 1005 and Bluetooth transceiver 1010. FIG. 10 also depicts communication device 102, which includes Bluetooth transceiver 1015, CVSD decoder 1020, byte sequencer 1025, and binary data sequence 1030. Local endpoint 104 is configured to generate CVSD data 1005 representing encrypted data directly, and transmit the CVSD data over a Bluetooth data link via Bluetooth transceiver 1010. Communication device 102 receives the CVSD data 1005 via Bluetooth transceiver 1015, and decodes the data into a multi-data byte sequence, which is provided to byte sequencer 1025 and converted into binary data sequence 1030, wherein binary data sequence 1030 is a replicated version of CVSD data 1005.

Framing

In many embodiments, arbitrary data is not represented as a constant bit stream, but is usually broken up into 8 bit bytes (or more) of data. Thus in some embodiments, a byte framing scheme is proposed to help the receiver determine which bits of the stream belong to an individual byte and to help with resynchronization in the event of data loss or corruption. In one embodiment, the proposed scheme comprises a mechanism based on the RS-232 serial data specification. The transmitter emits one start bit, followed by the 8 (or more) data bits belonging to a single multi-bit byte, optionally followed by a parity bit which could be used to determine corruption, and then followed by a stop bit. An example of such a coding scheme is depicted in FIG. 5. This means that each multi-bit data byte would take either 10 or 11 bits to transmit further reducing the throughput by 8/10ths or 8/11ths. A more advanced coding scheme may be used if better error resiliency, lower overhead, or forward error correction is desired. A simple improvement would be to match the framing used by the link level in order to improve performance when frames are dropped.

Although features and elements are described above in particular combinations, those having ordinary skill in the art will appreciate that each feature or element can be used alone or in any combination with the other features and elements without departing from the scope and spirit of the present disclosure.

The invention claimed is:

1. A method comprising:
    receiving a bit pattern at a byte generator that is representative of a binary data sequence;
    generating by the byte generator, a multi-bit data byte sequence that is representative of the bit pattern by, for at least one bit in the bit pattern: (i) outputting a larger-valued multi-bit data byte that is larger than a byte-sequencer reference data byte according to a first criteria, (ii) outputting a smaller-valued multi-bit data byte that is smaller than the byte-sequencer reference data byte according to a second criteria; and
    encoding by an encoder coupled to the byte generator, the generated multi-bit data byte sequence by, for each generated multi-bit data byte: (i) outputting a single bit whose value is indicative of whether the generated multi-bit data byte is larger or smaller than a current reference multi-bit data byte and (ii) updating the current reference multi-bit data byte based on the generated multi-bit data byte.

2. The method of claim 1, wherein generating the multi-bit data byte sequence that is representative of the bit pattern further comprises:
    updating the byte-sequencer reference data byte with the larger-valued multi-bit data byte according to the first criteria, and
    updating the byte-sequencer reference data byte with the larger-valued multi-bit data byte according to the second criteria.

3. The method of claim 1, wherein the bit pattern is generated via a pattern-setting function applied to the binary data sequence.

4. The method of claim 3, wherein each bit in the binary data sequence is represented by a respective single bit in the bit pattern.

5. The method of claim 3, wherein each bit in the binary data sequence is represented by a string of multiple data bits in the bit pattern.

6. The method of claim 1, wherein the binary data sequence is encrypted audio data.

7. The method of claim 1, wherein encoding the generated multi-bit data byte sequence includes performing a Continuously Variable Slope Delta (CVSD) conversion.

8. An apparatus comprising:
    a byte generator configured to:
        receive a bit pattern that is representative of a binary data sequence; and
        generate a multi-bit data byte sequence that is representative of the bit pattern, wherein the multi-bit data byte sequence includes, for at least one bit in the bit pattern, the byte generator further configured to:
        (i) output a larger-valued multi-bit data byte that is larger than a current byte-sequencer reference data byte according to a first criteria, and (ii) output a smaller-valued multi-bit data byte that is smaller than the current byte-sequencer reference data byte according to a second criteria; and an encoder configured to encode the generated multi-bit data byte sequence, and for each generated multi-bit data byte, (i) output a single bit whose value is indicative of whether the generated multi-bit data byte is larger or smaller than a current reference multi-bit data byte and (ii) update the current reference multi-bit data byte based on the generated multi-bit data byte.

9. The apparatus of claim 8, wherein the encoder is further configured to:

maintain a step size, and responsive to the consecutive output of single bits of the same value, change the value of the step size.

10. The apparatus of claim 9, wherein the generator is configured to:

output a larger-valued multi-bit data byte by outputting a multi-bit data byte with a value equal to the current byte-sequencer reference data byte plus the step size; and output a smaller-valued multi-bit data by outputting a multi-bit data byte with a value equal to the current byte-sequencer reference data byte minus the step size.

11. The apparatus of claim 8, wherein the binary data sequence is encrypted audio data.

12. The apparatus of claim 8, wherein the bit pattern is generated via a pattern-setting function applied to the binary data sequence.

13. The apparatus of claim 8, wherein each bit in the binary data sequence is represented by a string of multiple data bits in the bit pattern.

14. The apparatus of claim 8, wherein the binary data sequence is encrypted audio data.

15. The apparatus of claim 8, wherein the encoder is configured to encode the generated multi-bit data byte sequence using Continuously Variable Slope Delta (CVSD) conversion.

16. An apparatus comprising:

circuit means for receiving a bit pattern that is representative of a binary data sequence;

circuit means for generating a multi-bit data byte sequence that is representative of the bit pattern by, for at least one bit in the bit pattern: (i) outputting a larger-valued multi-bit data byte that is larger than a byte-sequencer reference data byte according to a first criteria, and (ii) outputting a smaller-valued multi-bit data byte that is smaller than the byte-sequencer reference data byte according to a second criteria; and circuit means for encoding the generated multi-bit data byte sequence by, for each generated multi-bit data byte: (i) outputting a single bit whose value is indicative of whether the generated multi-bit data byte is larger or smaller than a current reference multi-bit data byte and (ii) updating the current reference multi-bit data byte based on the generated multi-bit data byte.

* * * * *